May 11, 1926.
M. ARROWITZ
1,584,269
PNEUMATIC POWER VEHICLE BRAKE
Filed Sept. 11, 1925   2 Sheets-Sheet 2
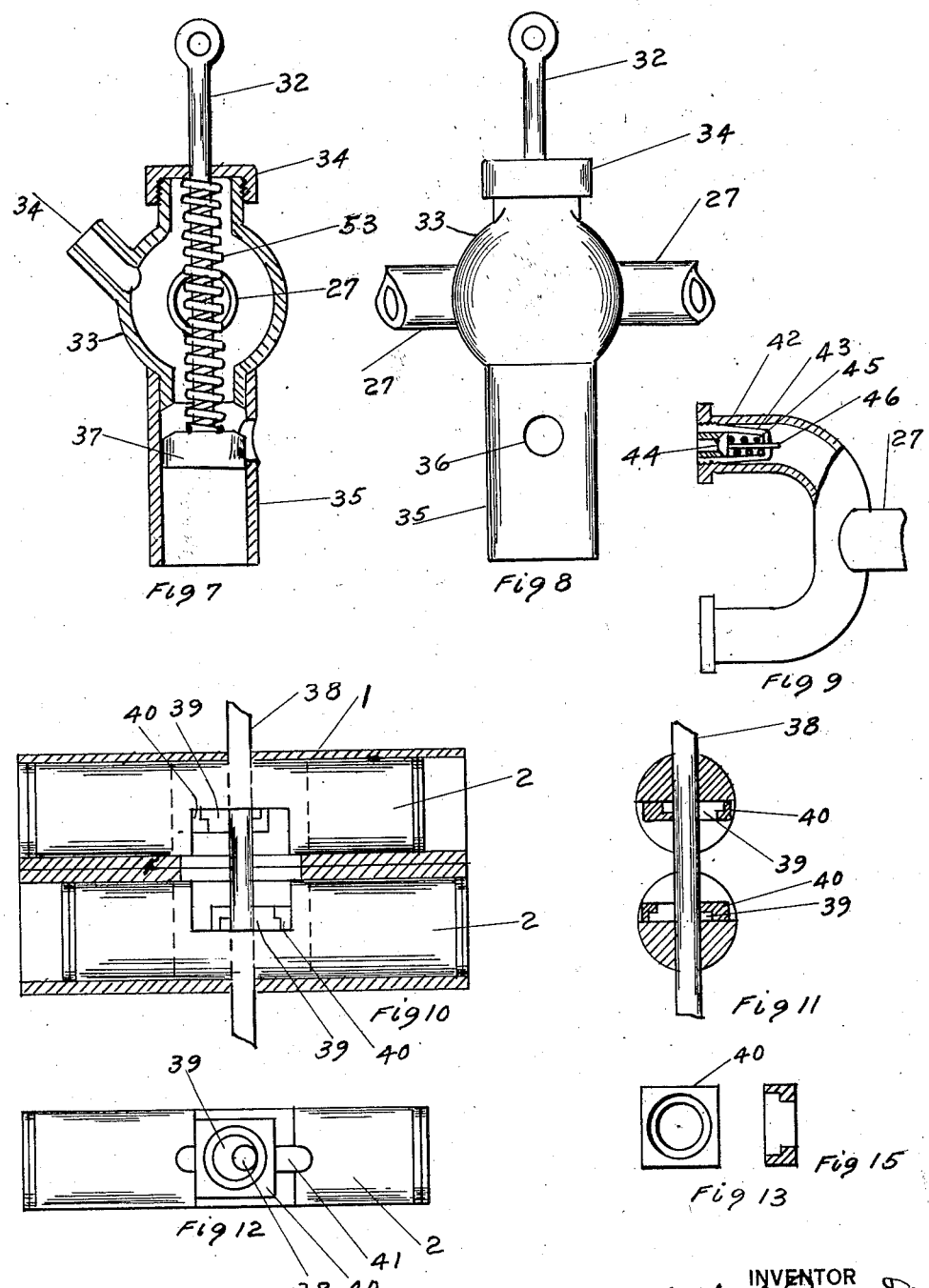
INVENTOR
Michael Arrowitz
BY
Oscar T. DeWitt
ATTORNEY Patented May 11, 1926.

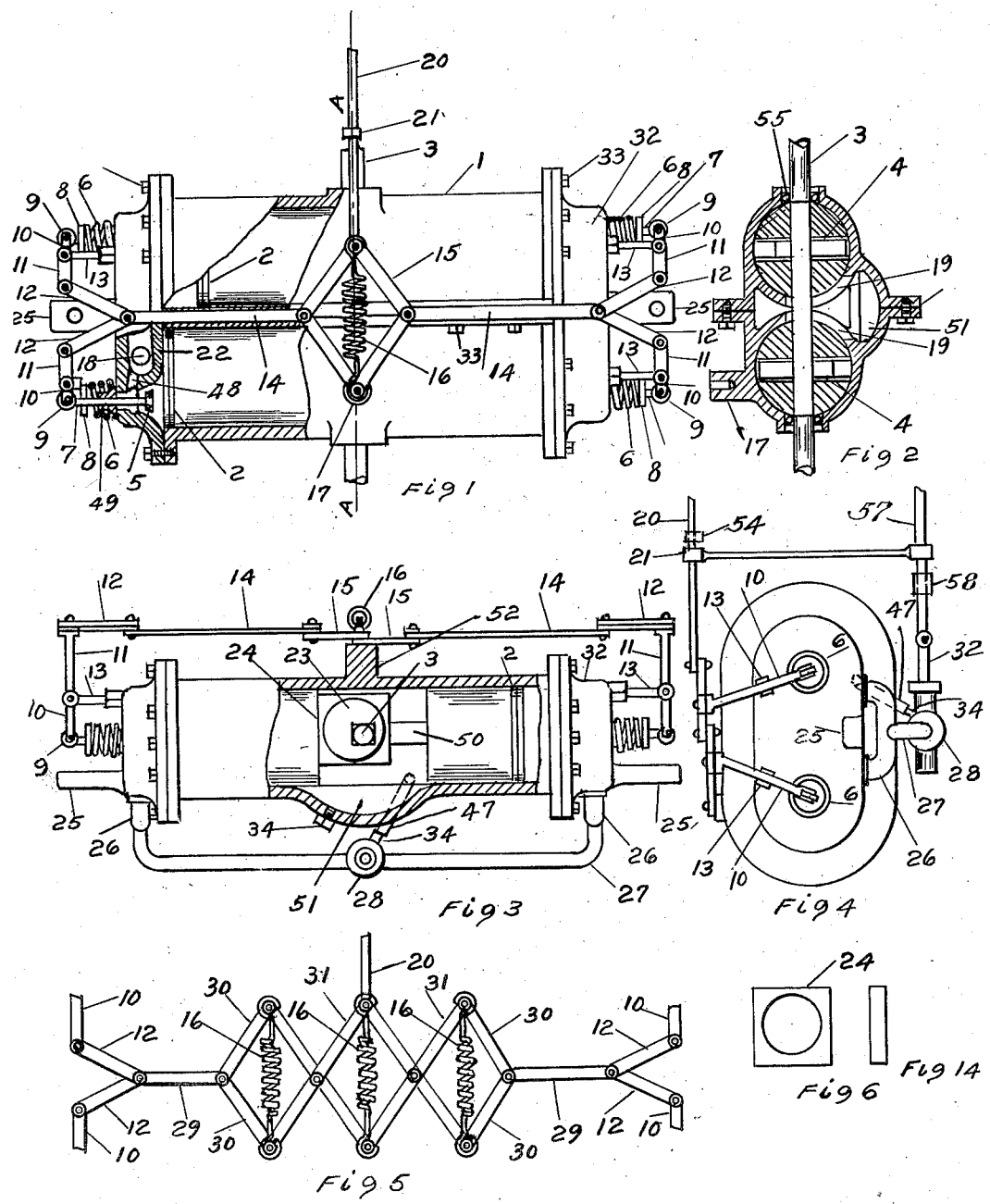

1,584,269

UNITED STATES PATENT OFFICE.

MICHAEL ARROWITZ, OF PITTSFIELD, MASSACHUSETTS.

PNEUMATIC POWER-VEHICLE BRAKE.

Application filed September 11, 1925. Serial No. 55,867.

This invention relates to a novel arrangement of brakes for motor vehicles and consists in the novel features hereinafter described and claimed.

An object of the invention is to provide means by which the brake may be directly applied to the driving shaft of the motor thereby bringing the vehicle to a state of rest.

Another object of the invention is to provide means whereby the brake may be applied by a foot-brake, or by an emergency brake, directly on the driving shaft of the motor.

A further object of the invention is to eliminate brake drums and bands, and to provide a more efficient method to bring a motor vehicle to a state of rest, thereby doing away with the disadvantage and inconvenience of replacing brake bands and brake lining.

In the accompanying drawings I have illustrated a preferred embodiment of my invention, but it is to be understood that my invention is not limited to the details of construction shown but covers all modifications and variations of such details as properly fall within the scope of the appended claims.

In the drawings Figure 1 is a plan view partly in section to clearly show my invention.

Figure 2 is a sectional view on the line A—A.

Figure 3 is an elevation view of my invention in part section to more clearly illustrate the device.

Figure 4 is an end view.

Figure 5 is another arrangement to show the operation of the valve links.

Figure 6 is an elevation view of the cam bearing.

Figure 7 is a sectional view of the emergency valve.

Figure 8 is an elevation view of the emergency valve.

Figure 9 is a view in part section of the U shaped exhaust showing one of check valves enclosed therein.

Figure 10 is a sectional view of the casing showing another arrangement of the shaft and cam.

Figure 11 is a sectional view of the pistons to more clearly show the arrangement of the shaft and cam.

Figure 12 is an elevation view of one piston showing arrangement of shaft and cam.

Figure 13 is an elevation view of the cam bearing used with shaft 38.

Figure 14 is a side view of the cam bearing used with shaft 3.

Figure 15 is a side view of the cam bearing used with shaft 38.

As illustrated in the accompanying drawing, 1 is a casing for the pistons 2, and the casing is made in two separate sections and fastened together by the cap screws 33. A gasket or other means may be used to insure a tight joint between the casings. The casings are cut away at 19 to allow the oil in the oil chamber 51 to come in contact with the pistons 2, and the oil chamber is provided with an oil drain 34 to provide means to draw off the oil. The pistons 2 as shown in Figure 3 are provided with a longitudinal slot 50, and this slot is the means provided for the shaft 3 to rotate freely thru the pistons and also to provide means for the longitudinal action of the cylinders. A cam 23 is rigidly secured to the shaft 3 and the cam rotates in a cam bearing 24. The pistons are also provided with a slot 4, transversely of the pistons, and the cam 3 and the cam bearing 24 are inserted in the slot, and then the shaft 3 is inserted through the pistons and the cam is square shaped, and the longitudinal slot in the pistons is just large enough to allow the shaft to freely rotate. The shaft is also provided with ball bearings as shown by the numeral 55.

The casings are provided with two covers 32, and these covers are securely fastened to the casings by means of the set screws 33. A gasket or other means may be used to insure a tight joint between the casings and the covers. The cover has a rib 22 on the inner side and this rib separates the piston chambers. A hollow space is provided between the rib 22 and the top of the cover and is large enough to accommodate the air compressed by the pistons. Holes 18 pass through the cover and provide the means to carry away the air compressed by the pistons through the U shaped exhaust pipe 26 into the main exhaust pipe 27.

Each cover is provided with two valves 5, with a valve stem 7 which passes through the gland 49. The valve is held open by means of a spring 6, which spring is held in place by a collar 8. An exhaust passage 48 allows the compressed air to enter the hollow chamber and into the hole 18. The covers 32 are also provided with the lugs 25, which lugs may be of any construction and are for the purpose of fastening the entire device to the motor or vehicle frame.

A lever 10 is provided with a roller 9 which roller is pivotally connected to the lever, and the said roller is held in contact with the valve stem 7. The outer part of the lever 10, as shown at 11, is turned over and pivotally connected to the links 12. A support 13 for said lever is rigidly connected to the cover and pivotally connected to the lever 10.

A series of links 15 are pivotally connected together, and the links 14 are also pivotally connnected to the links 15 and the links 12. A spring 16 is connected at the terminus of the links 15, and the tension from the said spring holds the valves 5 open. One of the casings has a lug 52 projecting therefrom and two of the links 15 are pivotally connected thereto.

The exhaust pipe 27 enters each side of the emergency valve 28 and discharges the compressed air from the pistons into the said valve. The valve is provided with an opening 36 to allow the compressed air to escape.

The emergency valve 28 consists of a casing 33 and extending from the casing is a breather 34. A valve stem 32 provided with a valve 37 is held in an open position by means of the spring 53. A cover 34 is threaded on the valve casing and holds the spring 53 in place. A breather pipe 47 is connected to each casing, just above the oil line in the oil chamber, and the said breather pipe is connected to the breather on the valve. The purpose of the breather pipe is to relieve any compression that may take place in the oil chamber due to the action of the pistons.

A foot brake rod 20 is pivotally connected to two of the links 15, and a connecting rod 21 connects the foot brake rod and the emergency lever brake rod 57 together.

The U shaped exhaust pipe 26 is provided with check valves, which valves consist of a support 42 which support is threaded into the exhaust pipe as shown at 42. A valve 44 is held in a closed position by means of the spring 45 and the valve stem 46, which valve stem passes through the support 43. This valve provides the means to prevent the exhaust air from one cylinder passing into the other cylinder.

In Figure 5 is shown another means of link arrangement to work the levers 12 to close the valves 5, and consist of links 29, 30 and 31, and all links are pivotally connected together.

Figures 10, 11 and 12 also show another arrangement of operating the pistons by having the cam 39 rigidly connected to the shaft 38, and the pistons cut away for the insertion of the shaft and cam and the cam bearing 40.

The operation of the device is as follows:—

When it is desired to operate the foot rod brake 20, a pull is exerted on the brake rod 20 and this motion is imparted to the links 15 and in turn to the links 14 and 12. This action causes the rod 11 to release the pressure on the springs 6 and to cause the valves 5 to close, thereby cutting off the exhaust from the piston, and the compression caused thereby in the cylinders, will cause the shaft 3 to stop rotating, thereby bringing the vehicle to a stop.

The device may also be operated by a pull on the emergency lever brake rod 57, and the connecting rod 21 being rigidly connected to the emergency lever brake 57, will cause the rod to slidably operate on the foot brake rod 20, and come in contact with the stop 54, which stop is rigidly secured to the foot brake lever, and close the valve 5 and the emergency valve 28 both at the same time. A turn buckle 58 may be attached to the emergency lever brake rod 57, so as to adjust a difference between the two brake rods.

Having described the invention what is claimed is:—

1. A pneumatic vehicle brake comprising two separate piston casings, said casings provided with an oil chamber, pistons inserted within said casings, a cam and cam bearing inserted in said pistons, a shaft extending through said pistons and cam, covers for the casing, valves inserted in said cover, means to hold said valves in position, means to operate said valves, a U shaped exhaust pipe, a main exhaust pipe, an emergency valve, a breather pipe attached to said emergency valve, means to operate the cover valves and said emergency valve.

2. A pneumatic vehicle brake comprising two separate piston casings, said casings provided with an oil chamber, pistons provided with a longitudinal and transverse slot, said pistons inserted within said casings, a cam and cam bearing inserted in the transverse slot in the pistons, a shaft extending through the longitudinal slot in the pistons and through the cam, ball bearings interposed between the shaft and the casing, covers secured to the casings, said covers provided with an air outlet from the cylinders, and said covers provided with a hollow chamber and an air outlet from the hollow chamber, valves inserted in said covers, means to hold said valves in position, means to operate said valves, a U shaped exhaust pipe leading into each cylinder, a main exhaust pipe connected to the said U shaped exhaust pipe, an emergency valve, a breather pipe attached to said emergency valve, means to operate the cover valves and said emergency valve.

3. A pneumatic vehicle brake comprising two separate piston casings, said casings provided in the center with an oil chamber, pistons provided with a longitudinal and transverse slot, said pistons inserted within said casings, a cam and cam bearing inserted in the tranverse slot in the pistons and through the cam, ball bearings interposed between the shaft and the casing, covers secured to the casings, lugs extending from said covers, said covers provided with an air outlet, said air outlet leading to an exhaust pipe, valves inserted in said covers, means to hold said valves in position, means to operate said valves, a U shaped exhaust pipe leading into each cylinder, said exhaust pipe provided with check valves, a main exhaust pipe connected to the said U shaped exhaust pipe, and said main exhaust pipe terminating in an emergency valve, an emergency valve, a breather pipe extending from the oil chamber in each casing and said breather pipe attached to the emergency valve, means to operate the cover valves and said emergency valve.

4. A pneumatic vehicle brake comprising two separate piston casings, said casings provided with an oil chamber, pistons provided with a longitudinal slot and an opening in the center, said pistons inserted within said casings, a cam rigidly attached to a shaft and rotating in a cam bearing, a circular shaft extending through the longitudinal slot in the pistons, ball bearings interposed between the shaft and the casing, covers secured to the casings, lugs extending from said covers, said covers provided with an air outlet above the cover valve seat, and said covers provided with a hollow chamber and an air outlet said air outlet leading to an exhause pipe, valves inserted in said covers, means to hold said valves in position, means to operate said valves, a U shaped exhaust pipe leading into each cylinder, said exhaust pipe provided with check valves, a main exhaust pipe connected to the said U shaped exhaust pipe, and said main exhaust pipe terminating in an emergency valve, an emergency valve, a breather pipe extending from the oil chamber in each casing and said breather pipe attached to the emergency valve, means to operate the cover valves and said emergency valves.

In testimony whereof I affix my signature.

MICHAEL ARROWITZ.